United States Patent [19]

Kito et al.

[11] Patent Number: 4,967,883

[45] Date of Patent: Nov. 6, 1990

[54] AUTOMATIC TRANSMISSION SHIFT LEVER DEVICE WITH PARK AND IGNITION INTERLOCK

[75] Inventors: Shozo Kito, Aichi; Shoichi Harada, Gifu; Hajime Imai, Aichi; Tsuyoshi Tanoue, Aichi; Shigetoshi Miyoshi, Aichi, all of Japan

[73] Assignees: Kabushiki Kaisha Tokai-Rika-Denki-Seisakusho; Toyota Jidosha Kabushiki Kaisha, Japan

[21] Appl. No.: 369,227

[22] Filed: Jun. 21, 1989

[30] Foreign Application Priority Data

Jun. 23, 1988 [JP] Japan .............................. 63-83077[U]
Jun. 27, 1988 [JP] Japan .............................. 63-84941[U]

[51] Int. Cl.⁵ ...................... B60K 41/04; B60K 41/26
[52] U.S. Cl. ..................................... 192/4 A; 70/239; 70/248; 70/252; 74/483 R; 74/878
[58] Field of Search ............. 192/4 A; 74/483 R, 878; 70/239, 245, 247, 248, 252

[56] References Cited

U.S. PATENT DOCUMENTS

| 3,590,613 | 7/1971 | Kimberlin et al. | 70/248 X |
| 4,232,571 | 11/1980 | Kimberlin | 74/878 |
| 4,235,123 | 11/1980 | Simancik et al. | 74/878 X |
| 4,854,193 | 8/1989 | Newman et al. | 70/248 X |

FOREIGN PATENT DOCUMENTS 60-135352 7/1985 Japan .

Primary Examiner—Rodney H. Bonck
Attorney, Agent, or Firm—Finnegan, Henderson, Farabow, Garrett & Dunner

[57] ABSTRACT

A shift lever device is used when an assembly of a vehicle is performed while the vehicle is being moved in a state where a shift lever of an automatic transmission gear is in a neutral state, i.e., in a state where wheels can be freely turned. A movable body is driven by a detent pin moved in the acial direction of the shift lever in a state where the shift lever is at a park position. The movable body is coupled to a steering locking device. An operator moves the movable body to a position at which it can be driven by the detent pin of the shift lever in spite of the fact that the shift lever is not at the parking position, so as to enable an igition key to be removed from the steering locking device.

18 Claims, 19 Drawing Sheets

AUTOMATIC TRANSMISSION SHIFT LEVER DEVICE WITH PARK AND IGNITION INTERLOCK

BACKGROUND OF THE INVENTION

1. Field of the Invention

The present invention relates to a shift lever device for use in an automatic transmission of the type in which a shift lever is locked in a park position under a predetermined condition. In particular, the present invention concerns a shift lever device for an automatic transmission which is designed to be convenient for performing an inspection on an inspection line after assembly.

2. Description of the Related Art

An automobile with an automatic transmission is known, in which a shift lever locking device and a steering locking device are coupled to each other by a control wire. Such an automobile is disclosed in the specification of, for example, Japanese Patent Laid-Open No. 60-135352. In the above-described type of automobile, when a steering locking device is locked by the operation of a key, a shift lever is locked in a park position. On the other hand, when the shift lever is at a position other than the park position, the locking of the steering locking device is blocked so as to prevent the key from being removed.

On the assembly line and inspection line of vehicles, assembly and inspection is performed on a vehicle while the vehicle is being moved by a conveyor 3 with one of the front wheels 1 (the left one as viewed in FIG. 20) and one of rear wheels 2 (the left one as viewed in FIG. 20) being on the conveyor 3. The other wheels are rolled on a floor, as shown in FIG. 20. In that case, if a shift lever is at the park position, the driving wheels of a vehicle are locked, and the wheels 1 and 2 will fall from the conveyor 3. So, the shift lever has to be positioned at a neutral position.

On the inspection line, inspection must be made as to whether or not the main key, located on the driver's side, can be inserted into a key cylinder in the doors and a key cylinder in the trunk. In order to carry out this inspection, the key must be removed from the key cylinder on the driver's side. However, the key cannot be removed unless the shift lever is shifted to the park position. As stated above, shifting of the shift lever to the park position locks the wheels.

SUMMARY OF THE INVENTION

In view of the above-described problems, an object of the present invention is to provide a shift lever for an automatic transmission of the type in which an ignition key can be removed from a key cylinder even if a shift lever is not located at a park position. Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention as embodied and broadly described herein, a coupling means transmits the shift of a shift lever, from a first position which ensures a free rotation of wheels to a second position at which rotation of the wheels is prevented to a steering device through a coupling means, so as to enable an ignition key to be turned to a locked position and removed from a key cylinder. Regardless of the provision of this coupling device, a temporary retaining means operates the steering locking device in a state where the shift lever is at the first position, and provides a false locked state in which the ignition key can be turned to the locked position.

In consequence, an operator can remove a key in a state where the wheels are rolling and inspect that key by providing a false locked state by the temporary retaining means. This false locked state is released by returning the shift lever to the parking position. So, the shift lever and the steering locking device are set in a coupled state after assembly. The accompanying drawings, which are incorporated in and constitute a part of this specification, illustrate embodiments of the invention and, together with the description, serve to explain the objects, advantages and principles of the invention.

BRIEF DESCRIPTION OF THE DRAWINGS

FIG. 5 (B) is a perspective view of the temporary retaining member;

FIG. 5 (C) is a section taken along the line VC—VC of FIG. 5 (A);

DETAILED DESCRIPTION OF THE PREFERRED EMBODIMENTS

A first embodiment of the present invention will now be described with reference to FIGS. 1 to 8.

Figure 2:
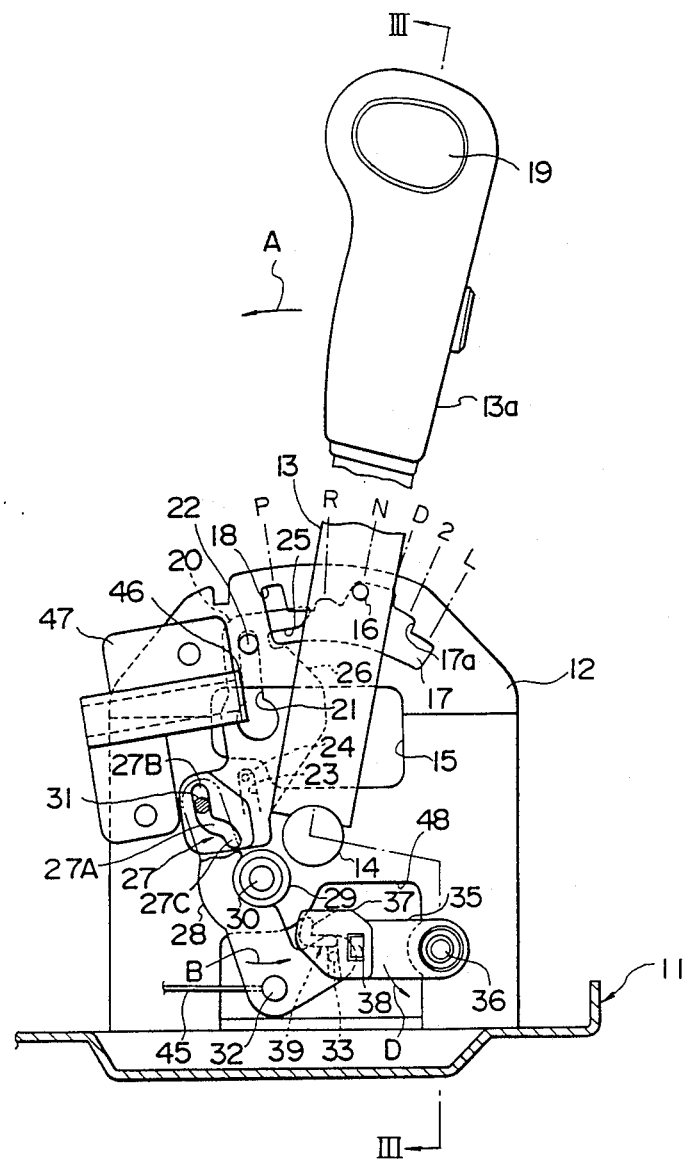
FIG. 2 is a rear view of FIG. 1.
Figure 3:
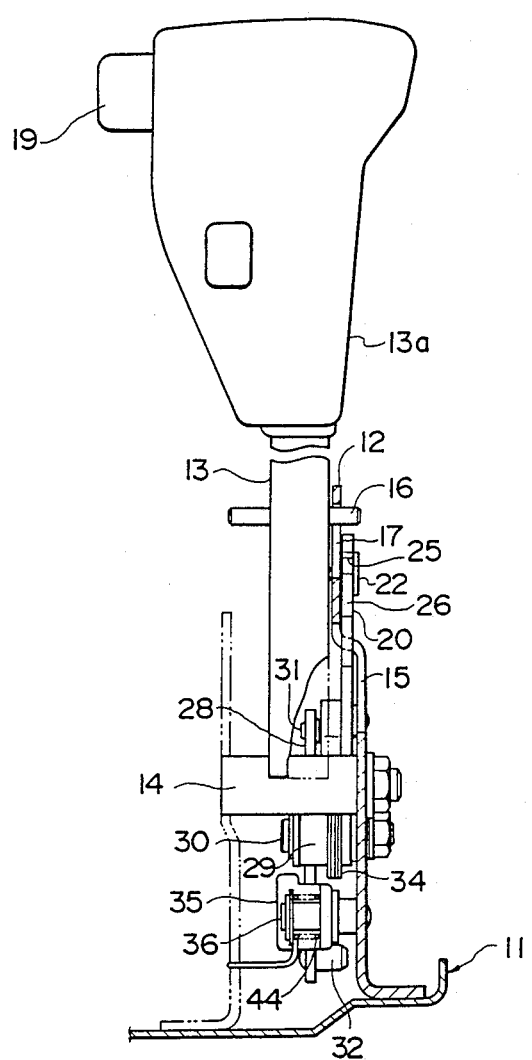
FIG. 3 is a section taken long the line III—III of FIG. 2.

Referring first to FIGS. 2 and 3, a frame 11 is mounted on a vehicle (not shown), and a detent plate 12 is fixed to this frame 11. A shift lever 13 is supported by the detent plate 12 through a shaft 14 in such a manner as to be pivotal about the shaft 14 in the direction indicated by the arrow A shown in FIG. 2 and in the direction opposite to that direction.

As shown in FIG. 3, the detent plate 12 is curved at an intermediate portion thereof in such a way that the entirety of the detent plate 12 has a crank-like form. An opening 15 is formed at this curved portion of the detent plate 12. Above the opening 15 is formed an engaging hole 17 with a restricting portion 17a, which, in cooperation with a detent pin 16, selectively positions the shift lever 13 at parking position "P", reverse position "R", neutral position "N", drive position "D", second position "2" or low position "L". A locking recess 18 is formed at a position corresponding to "P" position.

The detent pin 16 is provided in such a manner as to be movable in the axial direction of the shift lever 13. The detent pin 16 moves in one direction, i.e., it moves downward, and becomes disengaged from the restricting portion 17a when a press button 19 provided on a knob 13a of the shift lever 13 is pressed. Release of the pressing of the pressing button 19 causes the detent pin 16 to move in the other direction, i.e., to move upward, and become engaged with the restricting portion 17a of the engaging hole 17, thereby restricting the operation of the shift lever 13. In FIGS. 2 and 3, the shift lever 13 is located at "N" position.

Figure 1:
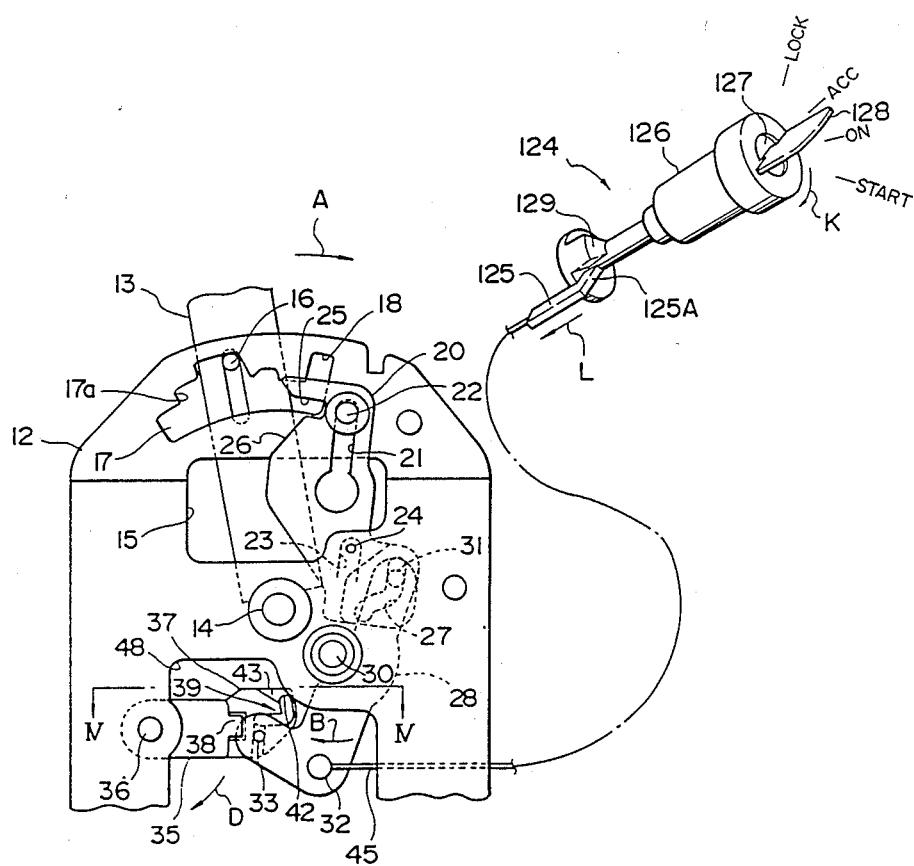
FIG. 1 is a side elevational view of the essential parts of a first embodiment of the present invention, which corresponds to the right side view of FIG. 3.

A movable body 20 passes through the opening 15 and extends in the vertical direction, as shown in FIG. 1. The movable body 20 has a slot 21 formed in the vertical direction. A pin 22 provided on the detent plate 12 is movably fitted in this slot 21. The movable body 20 also has a groove 23 in the inner surface thereof. A pin 24 provided on the detent plate 12 is fitted in this groove 23 in such a manner as to be movable along the groove 23. In this way, the movable body 20 can move relative to the detent plate 12 along a line that connects the locking recess 18 and the shaft 14. In FIGS. 2 and 3, the movable body 20 is located at a lower position and at an unlocking position.

As shown in FIG. 2, an engaging groove 25 is opened in the upper portion of the movable body 20 rightward as viewed in FIG. 2 and at a position where it faces the engaging hole 17. The portion of the movable body 20 located below the engaging groove 25 forms an inclined portion 26, which is inclined rightward and which engages with the detent pin. Below the movable body 20 is disposed a rotation arm 28. The rotation arm 28 has a cylindrical portion 29 at an intermediate portion, and this cylindrical portion is pivotaly supported on the detent plate 12 by a shaft 30. A pin 31 provided on the upper portion of the rotation arm 28 is inserted in a guide groove 27 formed in the movable body 20.

As shown in FIG. 2, the guide groove 27 consists of an intermediate portion 27A which is inclined from the direction of the movement of the movable body 20, and upper and lower end portions 27B and 27C which extend parallel to the direction of the movement of the movable body 20. Thus, when the shift lever 13 is shifted to the park position with the detent pin 16 being raised within the engaging hole 17, the pin 31 engages with the inclined portion of the guide groove 27, rotating the rotation arm 28 counterclockwise as viewed in FIG. 1 and locating it at a position shown in FIG. 7. Even if the locking recess 18 is formed deeper than necessary to cause the detent pin 16 to rise through a stroke longer than that required, which results in the further upward movement of the movable body 20, the pin 31 is received in the extended portion 27C, and this prevents further rotation of the pin 31 and the rotation arm 28.

On the other hand, when the detent pin 16 lowers into the locking recess 18, the guide groove 27 also lowers. This causes the pin 31 to be engaged with the inclined portion 27A, thereby returning the rotation arm 28 from the state shown in FIG. 7 to the state shown in FIG. 1. Even if the stroke of the lowering of the detent pin 16 is longer than that required, the pin 31 enters the extended portion 27B. This prevents the rotation arm 28 from being further rotated. A pin 32 protrudes from the lower portion of the rotation arm 28 toward the detent plate 12. An engaging pin 33 is provided on the surface of the rotation arm 28 opposite to that on which the pin 32 is provided. As shown in FIG. 3, a torsion coil spring 34 is wound around the cylindrical portion 29 of the rotation arm 28 so as to urge the rotation arm 28 in the direction indicated by the arrow B in FIG. 2.

In FIG. 1, one end of a control wire 45 is fastened to the pin 32 of the rotation arm 28. The other end of the control wire 45 is coupled to a locking lever 125 of a steering locking device 124.

In the steering locking device 124, a key rotor 127 is rotatably provided in a key cylinder 126, and an ignition key 128 is inserted into the key rotor 127. The key rotor 127 can be rotated in the direction indicated by the arrow K in FIG. 1 from "LOCK" position to "ACC" position, "ON" position, or "START" position. The ignition key 128 can be removed from and inserted into the key rotor 127 only when it is positioned at "LOCK". An engine is started by positioning the ignition key 128 at "START". The positioning of the ignition key 128 at "ON" causes the engine to be energized.

Figure 7:
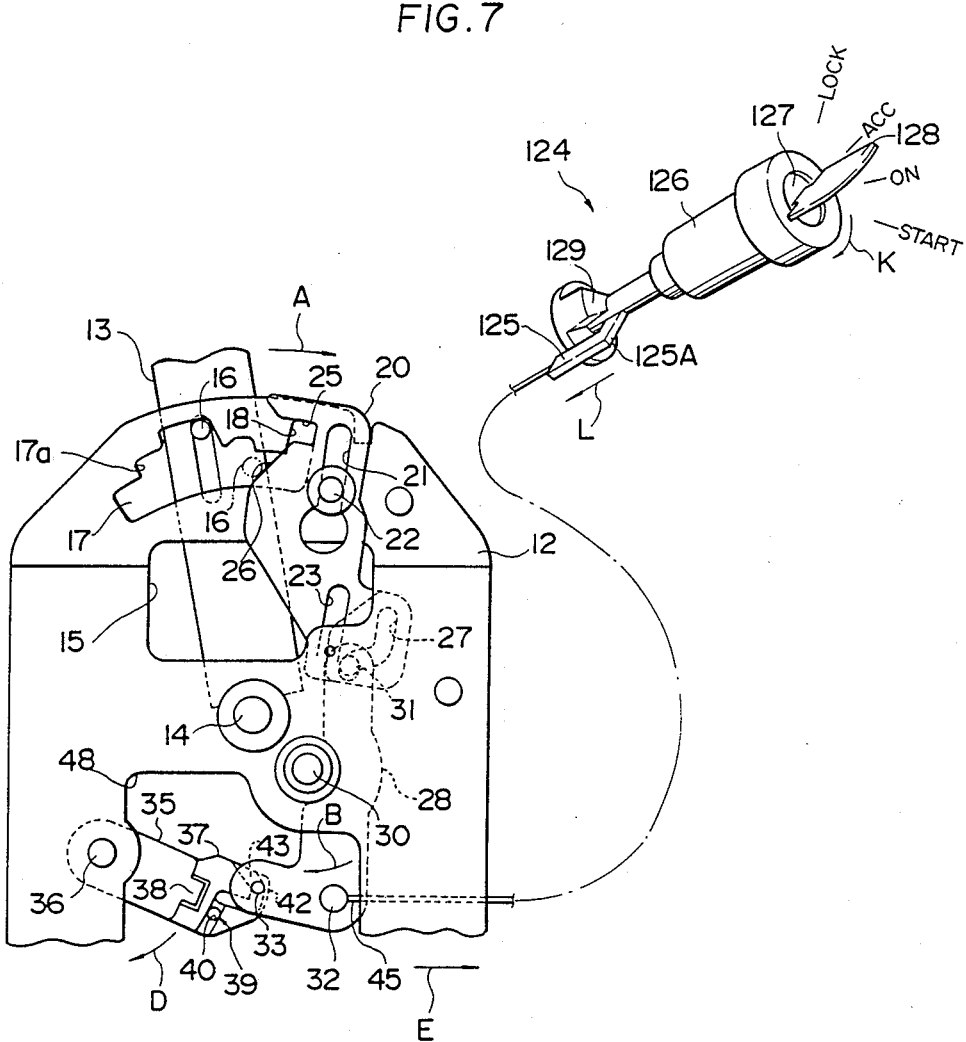

A cam protrusion 129 is coaxially coupled to the key rotor 127 in such a manner that it rotates together with the key rotor 127. The lock lever 125 is driven by the wire 45 in such a way that it moves within and out of the rotation locus of the cam protrusion 129. More specifically, in the state shown in FIG. 1, the shift lever 13 is located at a position other than the parking position, and the lock lever 125 is thus located within the locus of the cam protrusion 129, blocking the key rotor 127 from being rotated from "ACC" to "LOCK". Once the shift lever 13 is moved to the parking position with the detent pin 16 entering the locking recess 18, the lock lever 125 moves out of the locus of the cam protrusion 129, as shown in FIG. 7, allowing the key rotor 127 to be located to "LOCK". In particular, since the guide groove 27 of the movable body 20 has the extended portions 27B and 27C, unnecessary stroke of the detent pin 16 is absorbed, and this prevents the wire 45 from moving the lock lever 125 through a distance longer than that required. This makes the steering locking device 124 small in size, and prevents the reduction in the strength of a housing (not shown) and makes the housing small in size.

It may also be arranged in such a way that movement of the rotation arm 28 is detected by a switch and in such a way that locking lever 125 is accordingly driven not by the wire 45 but by a solenoid.

Figure 4:
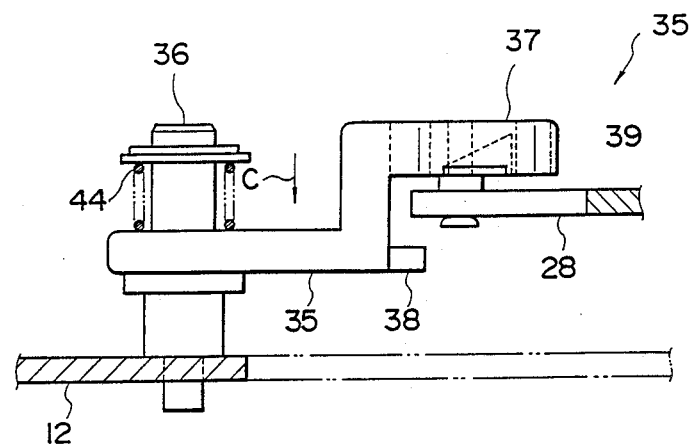
FIG. 4 is a section taken along the line IV—IV of FIG. 1.
Figure 5A:
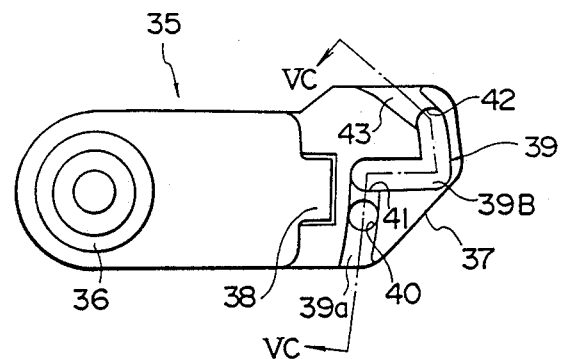
FIG. 5 (A) is an enlarged side elevational view of a temporary retaining member.
Figure 5B:
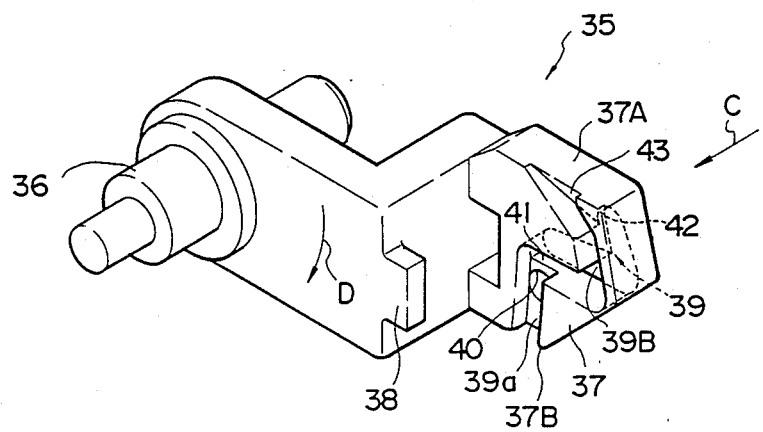
Figure 5C:
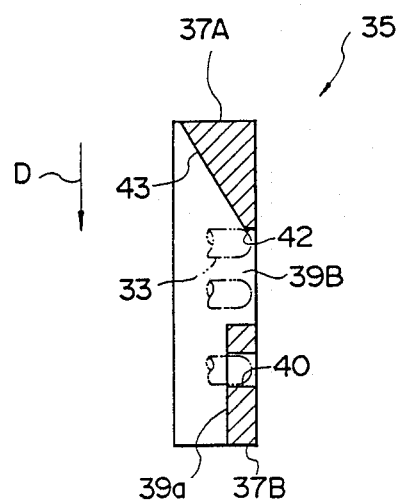

One end portion of a temporary retaining member 35 is pivotaly supported on the detent plate 12 through a pin 36. As shown in FIGS. 1, 4 and 5, the temporarily retaining portion 35 is provided with an arm portion 37 and a stopper portion 38 which face each other. A curved guide groove 39 is formed on one surface of the arm portion 37. The guide groove 39 reaches end surfaces 37A and 37B of the arm portion 37. An end portion 39A of the guide groove 39 located near the end surface 37B is shaped into an arc form with the pin 36 being the center of the arc. A hole 40 is formed at the intermediate portion of this end portion 39A, and the engaging pin 33 of the rotation arm 28 is fitted into this hole 40 so as to prevent the rotation of the temporary retaining member 35. The end of the end portion which is 39A remote from the end surface 37B, continues to a through groove 39B that extends substantially in the radial direction of the pin 36. The groove 39B penetrates the arm portion 37. A shoulder 41 is formed between the end portion 39A and the through groove 39B. The through groove 39B is curved at the intermediate portion, and the forward end thereof continues through a shoulder 42 to an inclined groove 43, which is gradually made shallow toward the end surface 37A. as shown in FIGS. 5 (B) and 5 (C).

A roughly wound coil spring 44 having the function of a compression coil spring and a torsion coil spring is provided on the pin 36. The temporary retaining member 35 is urged by this coil spring 44 in the direction in which the guide groove 39 of the temporary retaining member 35 engages with the engaging pin 33 of the rotation arm 28 (in the direction indicated by the arrow C in FIG. 4), as well as in the direction indicated by the arrow D in FIGS. 1 and 2 in which the temporary retaining member 35 is pivoted about the pin 36. Fitting of the engaging pin 33 of the rotation arm 28 into the hole 40 of the guide groove 39 in the temporary retaining member 35 causes the movable body 20 and the rotation arm 28 to be held in a first state shown in FIGS. 1 and 3. In that state, the forward end portion of the rotation arm 28 is located between the arm portion 37 and the stopper portion 38 of the temporary retaining member 35 (see FIG. 4).

As shown in FIG. 2, a shift lever stopper 46 is fixed to a bracket 47 located at the left of the engaging hole 17 as viewed in FIG. 2. The side surface of the shift lever 13 abuts against the forward end of the stopper 46 when the shift lever 13 is shifted to the "P" position, and the shift lever 12 is thus restricted from being further pivoted in the direction indicated by the arrow A. This in turn prevents the detent pin 16 from being pressed against the left edge of the engaging hole 17. Further, an opening 48 is formed at the lower portion of the detent plate 12 so as to enable an operator to operate the temporary retaining member 35.

The operation of the thus-arranged shift lever device will be described below.

On the assembly line, in a state wherein the shift lever 13 is at the "N" position, the movable body 20, the rotation arm 28, the temporary retaining member 35 and so on are mounted, and the hole 40 in the guide groove 39 of the temporary retaining member 35 is then engaged with the engaging pin 33 of the rotation arm 28, which provides for a first state (see FIG. 1). In this state, the movable body 20 is located at a lower position and at an unlocking position, and the rotation arm 28 is pivoted in the direction indicated by the arrow B. In this state, one end of the control wire 45, which is coupled with the steering locking device 124, is connected to the pin 32 of the rotation arm 28 while the tension thereof is being adjusted. In this state, the ignition key 128 of the steering locking device 124 is at the "ACC" position, as shown in FIG. 1, and is not therefore locked. In consequence, a steering wheel can be rotated.

Figure 6:
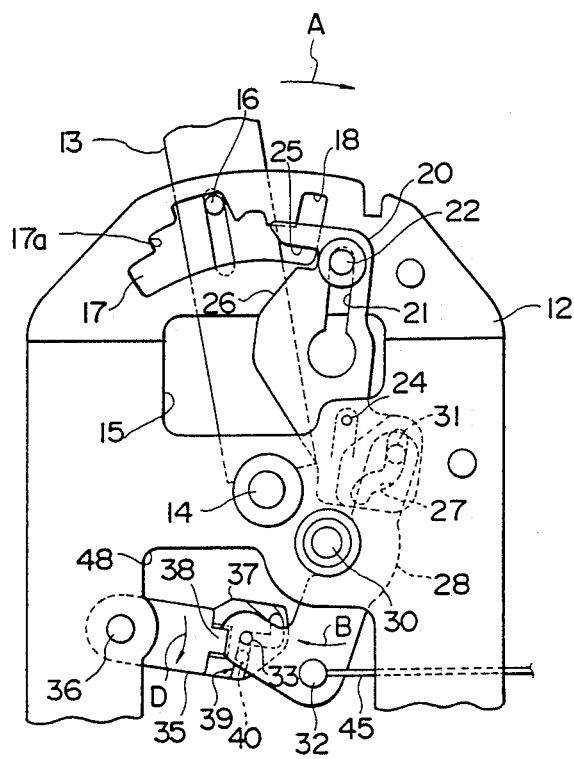
FIGS. 6 to 8 illustrate the operation of the first embodiment shown in FIG. 1.

Next, the engaging pin 33 is disengaged from the hole 40 by the pressing of the temporary retaining member 35 in the direction opposite to that indicated by the arrow C in FIG. 4 against the urging force of the coil spring 44. At that time, the stopper portion 38 abuts against the forward end of the rotation arm 28, thus restricting the further movement of the temporary retaining member 35 in the direction opposite to that indicated by the arrow C. After the engaging pin 33 has been disengaged from the hole 40, the temporary retaining member 35 is released, and this allows the temporary retaining member 35 to be pivoted about the pin 36 in the direction indicated by the arrow D due to the urging force of the coil spring 44. As a result, the engaging pin 33 passes over the first shoulder 41 and becomes engaged with the end of the through groove 39B, as shown in FIG. 6. This state is called a second state.

Thereafter, in a state where the shift lever 13 is located at the "N" position, the movable body 20 is moved upward by a finger to a locking position, a shown in FIG. 7. This causes the pin 31 of the rotation arm 28 to be relatively moved downward in the inclined portion 27A of the guide groove 27, pivoting the rotation arm 28 about the shaft 30 in the direction opposite to that indicated by the arrow B, and pivoting the temporary retaining member 35 in the direction indicated by the arrow D. As a result, the engaging pin 33 of the rotation arm 28 moves along the through groove 39B, and becomes engaged with the second shoulder 42, as shown in FIG. 7. This state is called a third state.

In the third state, the movable body 20 is temporarily retained at a locking position through the rotation arm 28 by the temporary retaining member 35, and the main portion of a locking device consisting of the movable body 20 and the rotation arm 28 is locked falsely. In this state, the rotation arm 28 is pivoted in the direction opposite to that indicated by the arrow B, and the control wire 45 is thus pushed in the direction indicated by the arrow E in FIG. 7. In consequence, the steering locking device 124 can be locked so as to allow the key to be removed from the driver's seat. Thus, in this state, the ignition key 128 is removed from the key rotor 127, and an inspection is then performed as to whether the key 126, coincide with the door key, and the key cylinder of the trunk.

Figure 8:
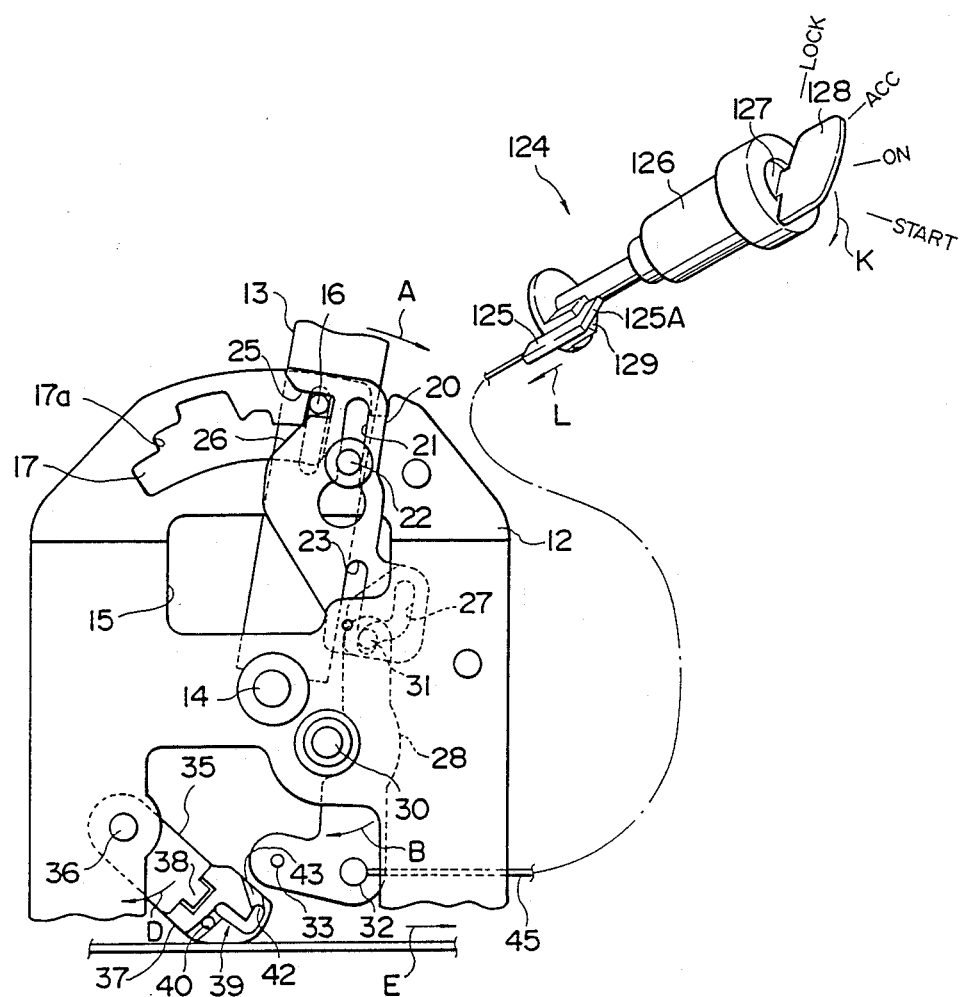
Figure 9:
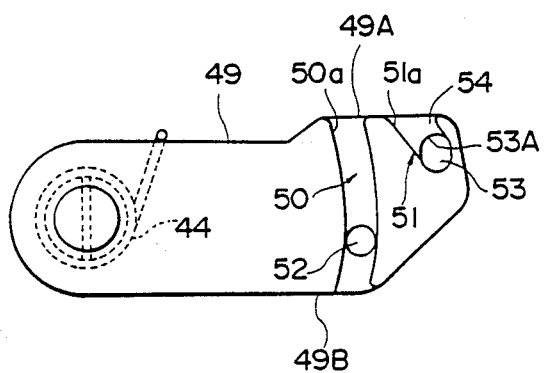
FIG. 9 is an enlarged side elevational view of a temporary retaining member of a second embodiment according to the present invention, which is similar to FIG. 5.

When the shift lever 13 is ready to be shifted to the "P" position after the inspection, the shift lever 13 is pivoted in the direction indicated by the arrow A by the pressing of the pressing button 19 of the shift lever and shifted to the "P" position from the "N" position. This causes the detent pin 16 to be moved along the inclined surface 26 of the movable body 20 and into the engaging groove 25. While the pin 16 is moving along the inclined surface 16, it presses the movable body 20 downward through the inclined surface 26, as shown by the dot-dot-dash line in FIG. 7. As the movable body 20 is moved downward, the pin 33 rises to the second shoulder 42, pivoting the rotation arm 28 in the direction indicated by the arrow B. The pin 33 then moves along the inclined surface 43 and disengages from the guide groove 39, causing the temporary retaining member 35 to be pivoted in the direction indicated by the arrow D and then separated from the rotation arm 28, as shown in FIG. 8. The movable body 20 is in engagement with the detent pin 16. As the pressing button 16 is released, the detent pin 16 and the movable body 20 are moved upward, and the detent pin 16 is thereby fitted into the locking recess 18 while the movable body 20 is located at the upper locking position. In this way, the temporary retaining of the movable body 20 is released, and this state is called a fourth state. Thereafter, the temporary retaining member 35 bears no relation with the movable body 20 and the rotation arm 28.

In this embodiment, the false locking state shown in FIG. 7 is provided by the contact of the engaging pin 33 with the shoulder 42. However, it may also be arranged such that the engaging pin 33 is contacted with the intermediate portion of the inclined groove 43, and such that this engaged state is maintained due to frictional force.

Next, the normal operation of the above-described locking device will be described. As shown in FIG. 8, in a state where the shift lever 13 is located at the "P" position and where the movable body 20 is located at a locking position, the steering locking device can be locked by the operation of the key 128 and the key 128 can be removed. Once the steering locking device has been locked, the control wire 45 blocks the pivoting of the rotation arm 28 in the direction indicated by the arrow B, thereby restricting the movable body 20 at a locking position by the rotation arm 28. In this state, the detent pin 16 cannot be moved downward even when the pressing button 19 of the shift lever 13 is pressed. The shift lever 13 cannot be therefore shifted from the "P" position to another position.

When an engine is started by the insertion and operation of the key 128, the steering locking device is unlocked. Further, restriction by the control wire 45 is released, and pivot of the rotation arm 28 in the direction indicated by the arrow B is thereby permitted. In this state, the detent pin 16 and the movable body 20 are thus moved downward by the pressing of the pressing button 19, and the detent pin 16 is thereby disengaged from the locking recess 18 while the movable body 20 is located at an unlocking position. As a result, the shift lever 13 can be shifted from the "P" position to another position.

In a state where the shift lever 13 is located at a position other than the "P" position, e.g., at the "N" position, the control wire 45 blocks the locking of the steering locking device, thereby preventing the key 128 from being removed. Once the shift lever 13 is shifted from a position other than the "P" position to the "P" position, the restriction of the steering locking device by the control wire 45 is released. In consequence, the steering locking device can be locked and the key 128 can be removed, as stated previously.

While the movable body 20 is being moved upward and downward, the pin 31 is brought into engagement with the inclined portion 27A of the guide groove 27, generating a rotational force on the rotation arm 28. At that time, even if the depth of the locking recess 18 varies, the excess stroke of the movable body 20 caused by variations in the depth of the locking recess 18 is absorbed by the extended portions 27B and 27C, thereby eliminating unnecessary movement of the wire 45.

In the above-described first embodiment in which the locking device for the shift lever 13 is coupled to the steering locking device through the control wire 45, the movable body 20 is temporarily retained at a locking position by the temporary retaining member 35 through the rotation arm 28 in a state where the shift lever 13 is located at the "N" position during the assembly. This sets the main portion of the locking device in a false locked state (see FIG. 7). In this way, the steering locking device can be set in a locked state without shifting the shift lever 13 to the "P" position, enabling the key to be removed. This enables an inspection to be conducted without any problem.

A second embodiment of the present invention will be described below with reference to FIGS. 9 to 12. In this embodiment, a temporarily retaining member 49 has first and second guide grooves 50 and 51. The two ends of the first guide groove 50 reach end surfaces 49A and 49B of the temporary retaining member 49, respectively. A hole 52 is formed in the intermediate portion of the first guide groove 50. One end of the second guide groove 51 reaches the end surface 49A, and the other end reaches a hole 53. A shoulder 53A is formed between the hole 53 and the second guide groove 51. The second guide groove 51 located between the shoulder 53A and an opening 51a forms an inclined surface 54, which has the same function as that of the inclined groove 43.

Figure 10:
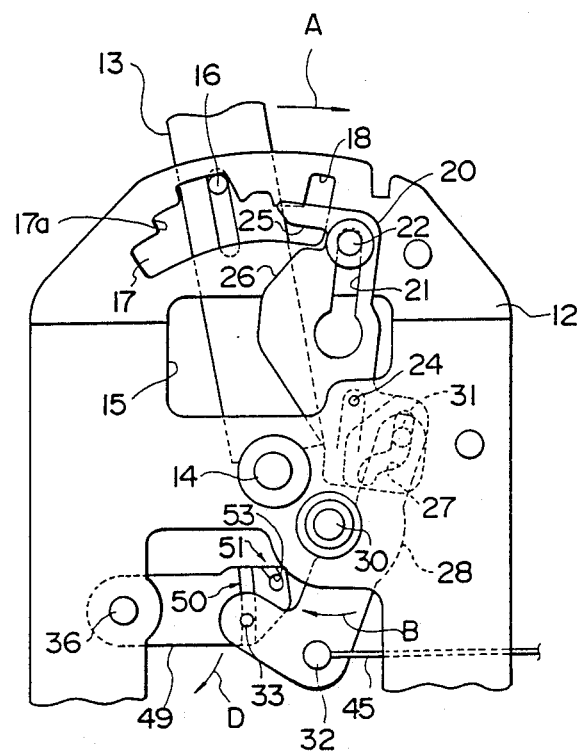
FIG. 10 is a side elevational view of the second embodiment of the present invention.

Thus, during assembly, in a state where the shift lever 13 is at the "N" position, as shown in FIG. 10, the hole 52 of the first guide groove 50 of the temporary retaining member 49 is engaged with the engaging pin 33 of the rotation arm 28 so as to retain the rotation arm 28 and the movable body 20 in a first state. In this state, the control wire 45 is fastened to the pin 32 of the rotation arm 28.

Figure 11:
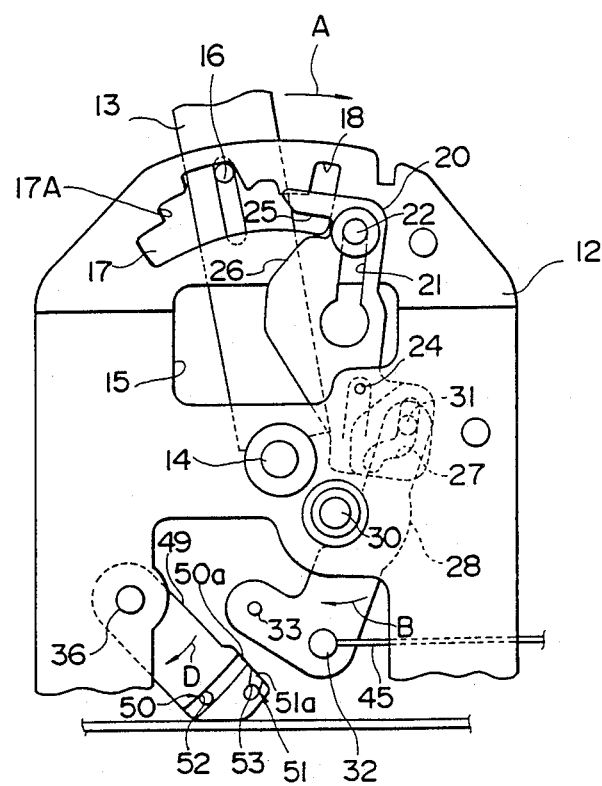
FIGS. 11 to 13 illustrate the operation of the second embodiment.

Next, the hole 52 is disengaged from the engaging pin 33 by pressing the temporary retaining member 49 against the urging force of the coil spring 44. This causes the temporary retaining member 49 to be pivoted in the direction indicated by the arrow D, thus causing the engaging pin 33 to be disengaged from an opening 50a of the first guide groove 50, as shown in FIG. 11.

Figure 12:
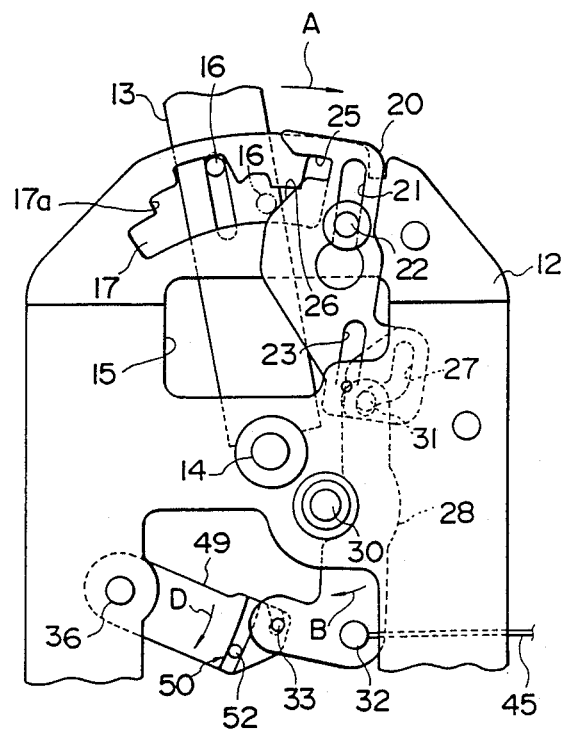

Thereafter, in a state where the shift lever 13 is at the "N" position, the movable body 20 is moved upward to a locking position, and then the shoulder 53A of the second guide groove 51 in the temporary retaining member 49 is brought into engagement with the engaging pin 33 of the rotation arm 28, as shown in FIG. 12. This state is called a third state. In this state, the movable body 20 is temporary retained in a lock position by the temporary retaining member 49 through the rotation arm 29, and the main portion of the locking device is set in a false locking state. In consequence, the steering locking device can be locked and the key can be removed from the driver's seat side, enabling an inspection to be performed without shifting the shift lever 13 to the "P" position.

Figure 13:
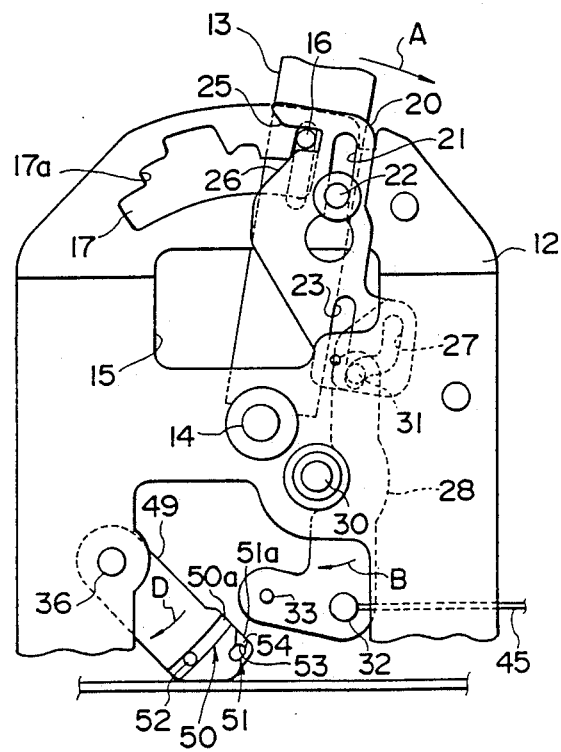
Figure 14:
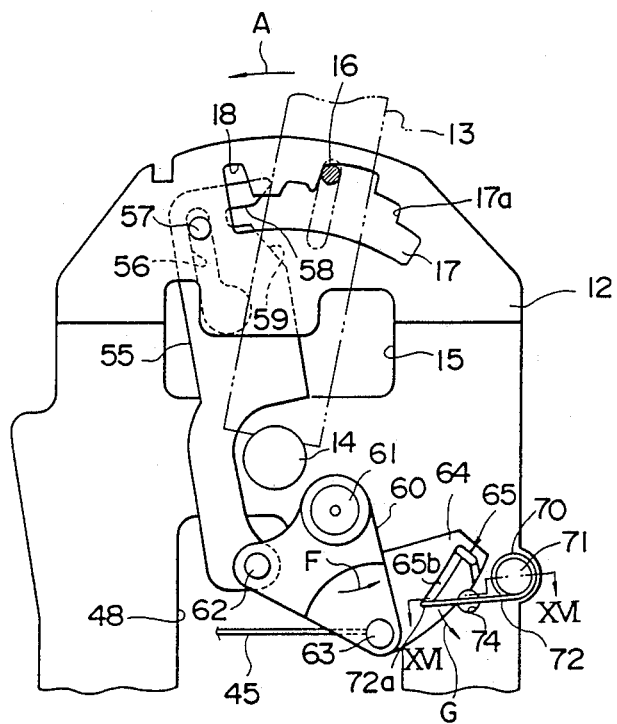
FIG. 14 is a side elevational view is side elevational view of a third embodiment of the present invention.

Thereafter, the shift lever 13 is forcibly shifted to the "P" position. This causes the movable body 20 to be pressed down by the detent pin 16 through the inclined portion 26, as in the case of the first embodiment, causing the rotation arm 29 to be pivoted in the direction indicated by the arrow B and causes the engaging pin 33 to be disengaged from the opening 51a of the second guide groove 51. As a result, the movable body 20 is moved to a locking position in a state where it is in engagement with the detent pin 16, and the temporary retaining member 49 is pivoted in the direction indicated by the arrow D and is thereby separated from the movable body 20 and the rotation arm 28, as shown in FIG. 13.

The thus-arranged second embodiment has the same advantage as that of the first embodiment.

A third embodiment of the present invention will be described now with reference to FIGS. 14 to 19. In this embodiment, a slot 56 is formed in a movable body 55 in the vertical direction, and this slot 56 is movably engaged with a pin 57 provided on the detent plate 12.

Figure 15:
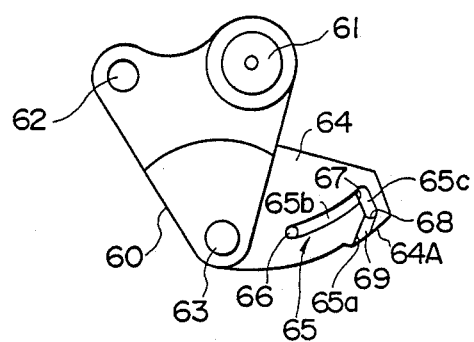
FIG. 15 is an enlarged side elevational view of a rotation arm employed in the third embodiment.

The movable body 55 also has an engaging groove 58 and an inclined surface 59. A rotation arm 60 is pivotably supported on the detent plate 12 by a shaft 61. The rotation arm 60 is urged by a torsion coil spring (not shown) in the direction indicated by the arrow F in FIG. 14. The rotation arm 60 is pivotaly connected to the lower portion of the movable body 55 through a pin 62. A pin 63, which is connected to the control wire 45, is provided on the lower portion of the rotation arm 60. The rotation arm 60 also has an arm portion 64, and a curved guide groove 65 is formed in the arm portion 64, as shown in FIG. 15. A hole 66 is formed at one end of the guide groove 65, and a through elongated hole 65C is formed in the intermediate portion of the guide groove 65, whereby first and second shoulders 67 and 68 are formed. The portion of the slot 65 located between the second shoulder 68 and an end surface 64A of the arm portion forms an inclined surface 69 having the same function as that of the inclined groove 43 of the first embodiment.

Figure 16:
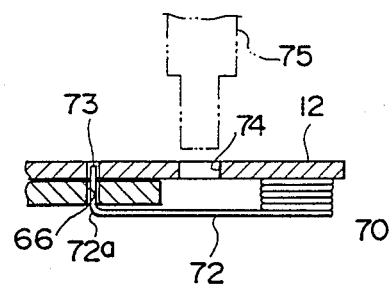
FIG. 16 is a section taken along the line XVI—XVI of FIG. 14.

A temporarily retaining member 70 which is a torsion coil spring is supported on the detent plate 12 through a pin 71 in such a manner that a forward end portion 72a of an arm portion 72 is urged in the direction indicated by the arrow G. At the time of assembly, the forward end portion 72a is fitted into the hole 66 in the guide groove 65 of the rotation arm 60, then into a hole 73 formed in the detent plate 12, as shown in FIG. 16 so as to provide a first state shown in FIG. 14. Further, a hole 74 is formed in the detent plate 12 at a position where it corresponds to the intermediate portion of the arm portion 72 of the temporary retaining member 70.

In the third embodiment, in a state where the shift lever 13 is at the "N" position, the forward end portion 72a of the arm portion 72 of the temporary retaining member 70 is fitted into the hole 66 in the rotation arm 60 then into the hole 73 in the detent plate 12 so as to retain the rotation arm 60 and the movable body 55 in a first state. In this state, the control wire 45 is fastened to the pin 63 of the rotation arm 60.

Thereafter, the forward end portion 72a is disengaged from the holes 73 and 66 by pressing the arm portion 72 of the temporary retaining member 70 by means of a tool 75 shown by the dot-dot-dash line in FIG. 16 which is passed through the hole 74 in the detent plate 12, and is then brought into engagement with the groove 65b of the guide groove 65.

Figure 17:
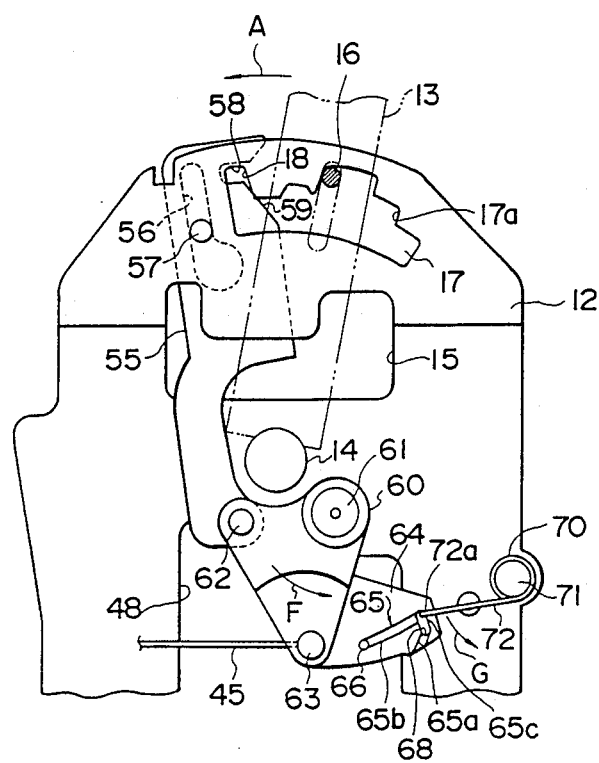
FIGS. 17 to 19 illustrate the operation of the third embodiment shown in FIG. 14.
Figure 18:
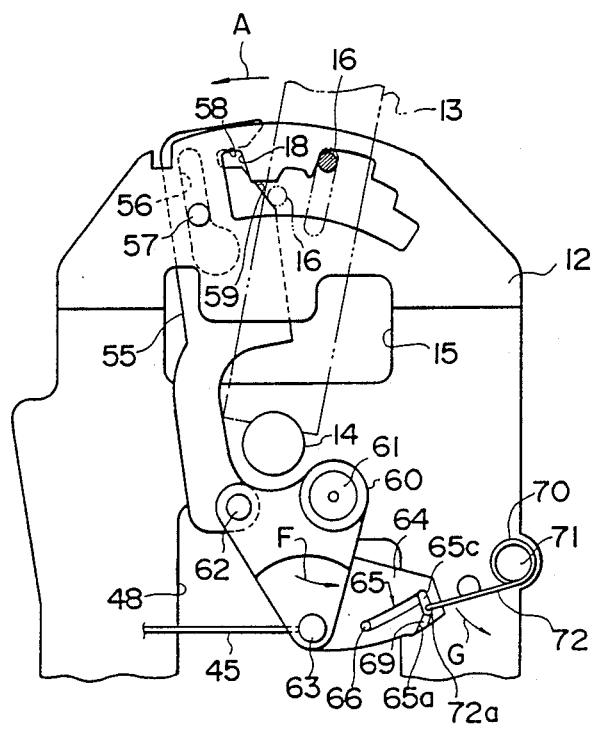
Figure 19:
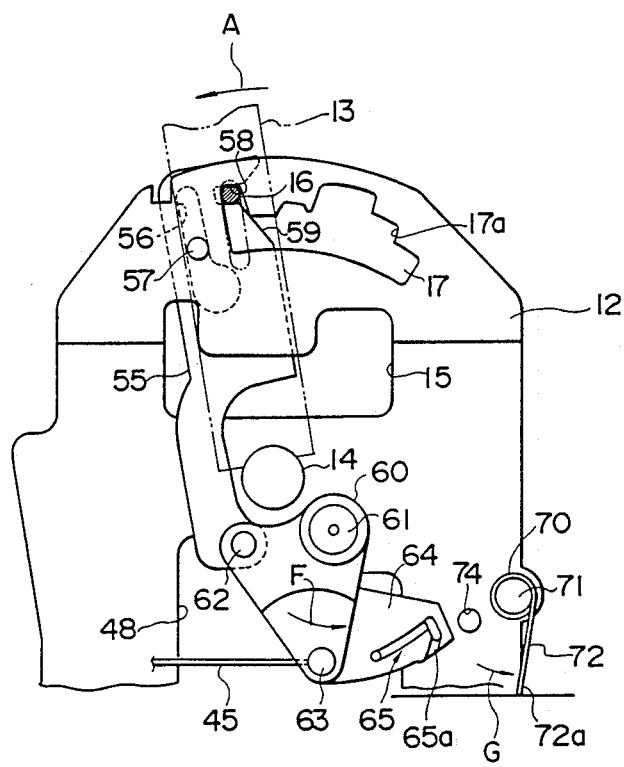
Figure 20:
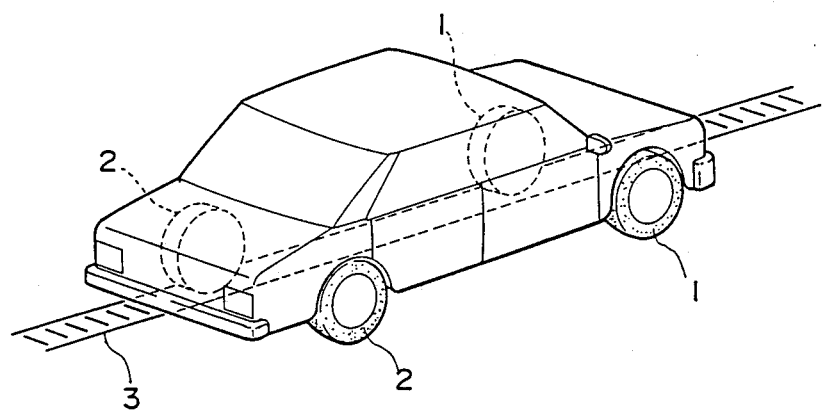
FIG. 20 is a perspective view, showing an assembly state in an inspection line.

Next, the movable body 55 is moved upward to a locking position in a state where the shift lever 13 is at the "N" position. This causes the rotation arm 60 to be pivoted in the direction opposite to that indicated by the arrow F in FIG. 17. As a result, the forward end portion 72a of the arm portion 72 moves relatively along and out of the groove 65b, as shown in FIG. 17, and becomes engaged with the first shoulder 67. Thereafter, the forward end portion 72a moves along through elongated hole 65c by its own spring force in the direction indicated by the arrow G, and becomes engaged with the second shoulder 68, as shown in FIG. 18. In this state, the movable body 55 is temporary retained in a locking position by the temporary retaining member 70 through the rotation arm 60, and the main portion of the locking device is set to a false locking state. In consequence, the steering locking device can be locked and the key can be removed from the driver's seat side, enabling an inspection to be carried out without shifting the shift lever 13 to the "P" position.

Thereafter, the shift lever 13 is forcibly shifted to the "P" position. This causes the movable body 55 to be pressed downward by the detent pin 16 through the inclined portion 69, as in the case of the first embodiment, thereby causing the rotation arm 60 to be pivoted in the direction indicated by the arrow B and the forward end portion 72a of the arm portion 72 of the temporary retaining member 70 to be separated from the opening 65a of the guide groove 65. As a result, the movable body 55 is moved to a locking position in a state where it is in engagement with the detent pin 16, and the arm portion 72 of the temporary retaining member 70 is pivoted in the direction indicated by the arrow G and is disconnected from the movable body 5 and the rotation arm 60.

The thus-arranged third embodiment of the present invention has the same advantage as that of the first embodiment.

What is claimed is:

1. A shift lever device in which a shift lever for an automatic transmission is coupled to a steering locking device to control an ignition key removal operation in said steering locking device of the type in which said ignition key can be removed when shifted to a locked position, comprising:

a detent means allowing for a selective operation of said shift lever from a first position, which ensures free rotation of wheels, to a second position at which rotation of the wheels is blocked on condition that a seat occupant performs a special operation;

a coupling means for operating said steering locking device in a state where said shift lever has been shifted to said second position so as to enable said ignition key to be rotated to the locked position; and a temporary retaining means for operating said steering locking device in a state where said shift lever is at said first position so as to make said steering locking device in a false locked state in which said ignition key can be rotated to a locked position regardless of said coupling means, whereby said key can be removed from said steering locking device in a state where the wheels can be rotated.

2. A shift lever device according to claim 1, wherein said temporary retaining means maintains part of said coupling means in a disconnected state.

3. A shift lever device according to claim 2, wherein said coupling means includes a wire which operates said steering locking device in such a way that said ignition key can be rotated to the locked position when said shift lever is shifted to said second position, and wherein said temporary retaining means is capable of driving said wire in said false locked state even when said shift lever has not been shifted to said second position so as to enable said ignition key to be rotated to the locked position.

4. A shift lever device according to claim 1, wherein said shift lever includes a detent pin having a raised position and which is operated by the special operation of the seat occupant, said shift lever being able to be moved from said first position to said second position when the seat occupant presses down said detent pin from its raised position, a movable body, having a lower position and a raised position and which constitutes part of said coupling means, being raised from the lower position by returning said detent pin to the raised position when said shift lever is at said second position, whereby said steering locking device is operated to enable said ignition key to be rotated to a locked position, and wherein, in said false locked state, said temporary retaining means being capable of driving said movable body from the lower position to the raised position even when said shift lever is at said first position.

5. A shift lever device according to claim 4, wherein said temporary retaining means includes a cam means for retaining said movable body at a raised position when said movable body is raised from a lower position in said false locked state.

6. A shift lever device according to claim 4, wherein said movable body includes a detent pin engaging portion which is moved downward from its raised position and releases the false locked state when said shift lever is shifted from said first position to said second position, whereby said steering locking device is thereafter operated so as to enable said ignition key to be rotated to the locked position when said shift lever is at said second position and said detent pin is raised, while, when said detent pin is at a lower position and said shift lever is at said first position, rotation of said ignition key to the locked position is disabled.

7. A shift lever device according to claim 5, wherein said cam means has a movable body retaining engaging portion for retaining said movable body to the lower position before said false locked state is provided.

8. A shift lever device according to claim 7, wherein said cam means has a detent pin engaging portion for maintaining said movable body at the raised position in said false locked state, said cam means disconnecting the coupling with said movable body using the force generated by the shift of said shift lever from said first position to said second position.

9. A shift lever device according to claim 5, wherein said movable body is coupled with a rotation arm which is mechanically or electrically coupled to said steering locking device, said movable body being retained at the raised position by the control of the rotation of said rotation arm by said cam means.

10. A shift lever device for coupling the operation of a shift lever for an automatic transmission gear with the rotational operation of an ignition key of a steering locking device, comprising:
a detent means allowing the movement of said shift lever to a first position at which free rotation of wheels is ensured when a detent pin provided on said shift lever in such a manner as to be movable between a releasing position and a restricting position is located at said releasing position in a state where said shift lever has selectively been located from said first position to a second position at which rotation of the wheels is blocked, said detent means retaining said shift lever at said second position when said detent pin is at said restricting position;
a movable body driven by said detent pin at said second position in such a way that it can be moved together with said detent pin between the releasing position and the restricting position, said movable body allowing said ignition key of said steering locking device to be moved to a locked position when said movable body is at the restricting position; and
a temporary retaining means enabling an operator to move said movable body from said releasing position to said restricting position regardless of said detent pin in a state where said shift lever is at said first position during the manufacture of a vehicle, said temporary retaining means temporarily retaining said movable body at said restricting position, whereby said ignition key can be rotated to the locked position and removed in a state where the wheels can be rotated freely.

11. A shift lever device according to claim 10, wherein said temporary retaining means releases the retaining of said movable body by the operation of an operator, said temporary retaining means having a retaining force which enables said movable body to be moved to said releasing position.

12. A shift lever device according to claim 11, wherein said movable body has a detent pin engaging portion which engages with said detent pin when said shift lever is moved to said second position and move said movable body to said releasing position against the retaining force of said temporary retaining means.

13. A shift lever device according to claim 10, including a rotation arm coupled to said movable body, said rotation arm being coupled to said steering locking device, the retaining force of said temporary retaining means being transmitted to said movable body through said rotation arm.

14. A shift lever device according to claim 13, wherein said temporary retaining means is a cam means for controlling the rotational angle of said rotation arm.

15. A shift lever device according to claim 14, wherein said cam means has a first engaging portion which enables said rotation arm to be rotated by a first operation of the operator, and a second engaging portion for retaining said rotation arm in a state where it has been rotated with a predetermined amount of resistance to rotation, the rotation of said rotation arm being achieved after said first operation by the shift of said movable body to said restricting position by the operator.

16. A shift lever device according to claim 15, wherein said movable body has a detent pin engaging portion for releasing the engagement of said second engaging portion and thereby separating said temporary retaining means from said rotation arm when said shift lever is shifted to said second position while said movable body is at said releasing position.

17. A shift lever device according to claim 10, wherein said temporary retaining means has a cam for releasing the coupling with said movable body and separating said movable body in a state where the temporary retaining state has been released.

18. A shift lever device for coupling the operation of a shift lever for an automatic transmission with the rotational operation of an ignition key of a steering locking device, comprising:
(a) a detent means allowing said shift lever to be moved to a first position at which free rotation of wheels is ensured when a detent pin provided on said shift lever in such a manner as to be movable between a releasing position and a restricting position is located at said releasing position in a state where said shift lever is selectively moved from said first position to a second position at which rotation of the wheels is blocked, said detent means retaining said shift lever at said second position when said detent pin is at said restricting position;
(b) a movable body driven by said detent pin at said second position in such a way that it can be moved straight together with said detent pin between said releasing position and said restricting position;

(c) a rotation arm driven by said movable body, said rotation arm allowing said ignition key of said steering locking device to be moved to the locked position so as to enable a key to be removed when said movable body is at said restricting position; and (d) a cam means including a pin provided on either said movable body or said rotation arm, and a cam groove provided on the other of said movable body and said rotation arm into which said pin is inserted, said cam groove having an inclined portion which is brought into engagement with said pin by the straight movement of said movable body between said releasing position and said restricting position so as to rotate said rotation arm, the end portion of said inclined portion having a nonoperated portion for receiving said pin when said movable body is moved through an excess stroke so that no rotation force is transmitted to said rotation arm.

* * * * *